United States Patent
Dumas et al.

(10) Patent No.: US 8,314,198 B2
(45) Date of Patent: Nov. 20, 2012

(54) APPARATUS AND PROCESS FOR GAS PHASE FLUIDISED BED POLYMERISATION REACTION

(75) Inventors: Thibault Dumas, Strasbourg (FR); Kevin Peter Ramsay, Livingston (GB)

(73) Assignee: Ineos Europe Limited, Hampshire (GB)

( * ) Notice: Subject to any disclaimer, the term of this patent is extended or adjusted under 35 U.S.C. 154(b) by 121 days.

(21) Appl. No.: 12/737,911

(22) PCT Filed: Sep. 21, 2009

(86) PCT No.: PCT/EP2009/062186
§ 371 (c)(1),
(2), (4) Date: Feb. 28, 2011

(87) PCT Pub. No.: WO2010/037653
PCT Pub. Date: Apr. 8, 2010

(65) Prior Publication Data
US 2011/0152489 A1    Jun. 23, 2011

(30) Foreign Application Priority Data
Oct. 3, 2008 (EP) .................................. 08165825

(51) Int. Cl.
*C08F 2/01* (2006.01)
*B01J 19/00* (2006.01)
(52) U.S. Cl. ........................................ 526/348; 422/131
(58) Field of Classification Search .................. 526/348; 422/131
See application file for complete search history.

(56) References Cited

U.S. PATENT DOCUMENTS

| 4,543,399 A * | 9/1985 | Jenkins et al. .................. 526/70 |
| 4,588,790 A | 5/1986 | Jenkins, III et al. |
| 2001/0037004 A1 | 11/2001 | Durand et al. |

FOREIGN PATENT DOCUMENTS

| EP | 0 301 872 A2 | 2/1989 |
| EP | 0 475 603 A1 | 3/1992 |
| EP | 0 855 411 A1 | 7/1998 |
| EP | 1 484 344 A2 | 12/2004 |
| WO | WO 99/61485 A1 | 12/1999 |
| WO | WO 02/41986 A1 | 5/2002 |

OTHER PUBLICATIONS

Corella, J., et al; "Increase of the Gas Conversion in a Fluidized Bed by Enlarging the Cross Section of the Upper Zone of the Bed"; *Ind. Eng. Chem. Process Des. Dev.*, vol. 22, pp. 329-334 (1983). Corella, J., et al; "Model for the Gas Flow in a Fluidized Bed with Increase of the Cross Section in its Upper Zone"; *Ind. Eng. Chem. Process Des. Dev.*, vol. 22, pp. 334-339 (1983).

* cited by examiner

*Primary Examiner* — William Cheung
(74) *Attorney, Agent, or Firm* — Nixon & Vanderhye

(57) ABSTRACT

The present invention relates to an apparatus and a process for polymerization, and, in particular, provides an apparatus for gas phase fluidised bed polymerization of olefins, which apparatus comprises: A) a first section which is an upright cylindrical section having a diameter, $D_1$, and cross-sectional area, $A_1$, and B) a second section, provided vertically above the first section and centered about a common vertical axis to the upright cylindrical first section, the base of the second section having a cylindrical cross-section of diameter $D_1$ and being joined to the top of the first section, and the horizontal cross-sectional area of the second section above its base being greater than the cross-sectional area of the first section, characterized in that: i) $D_1$ is greater than 4.5 meters, and ii) the second section has a maximum horizontal cross-sectional area, $A_2$, which is between 3.2 and 6 times the cross-sectional area, $A_1$, of the first section.

10 Claims, 1 Drawing Sheet

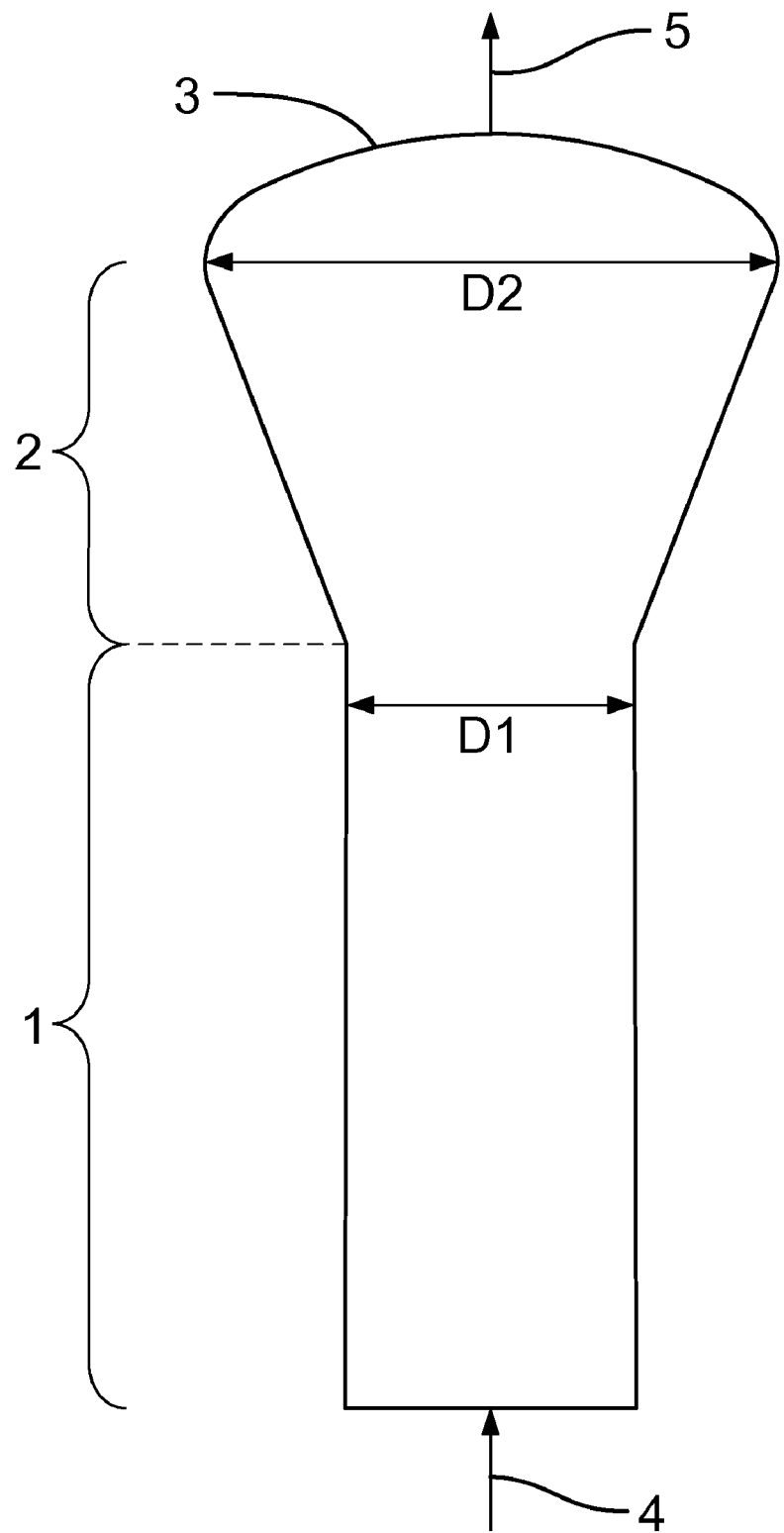

APPARATUS AND PROCESS FOR GAS PHASE FLUIDISED BED POLYMERISATION REACTION

This application is the U.S. national phase of International Application No. PCT/EP2009/062186 filed 21 Sep. 2009 which designated the U.S. and claims priority to European Application No. 08165825.4 filed 3 Oct. 2008, the entire contents of each of which are hereby incorporated by reference.

The present invention relates to an apparatus and a process for polymerisation, and, in particular, applicable to a gas phase fluidised bed polymerisation reaction.

Processes for the polymerization of olefins are well known in the art. Such processes can be conducted, for example, by introducing an olefinic monomer and other reagents, such as comonomers, chain transfer agents and inert reagents, into a polymerization reactor comprising polyolefin and a catalyst for the polymerization.

In the gas fluidised bed polymerisation of olefins, the polymerisation is conducted in a fluidised bed reactor wherein a bed of polymer particles is maintained in a fluidised state by means of an ascending gas stream (fluidising gas) comprising the gaseous reaction monomer. During the course of polymerisation, fresh polymer is generated by the catalytic polymerisation of the monomer, and polymer product is withdrawn to maintain the bed at more or less constant volume. An industrially favoured process employs a fluidisation grid to distribute the fluidising gas to the bed, and to act as a support for the bed when the supply of gas is cut off. The polymer produced is generally withdrawn from the reactor via a discharge conduit arranged in the lower portion of the reactor, near the fluidisation grid.

The reactor usually consists of a first section, referred to herein as the "fluidisation zone" and which is generally an upright cylindrical section, in which the fluidised bed of particles is maintained, above which is provided a second section which has an increased cross-sectional area compared to the fluidisation zone, and which is referred to herein as the "disengagement zone". In said disengagement zone, the increased cross-sectional area results in a reduction in the velocity of the fluidising gas. Particles which may be entrained therein can no longer be supported by the fluidising gas, and fall back into the bed. The fluidising gas then passes out of the top of the disengagement zone, from where it is normally recycled to the base of the reactor. Despite the above, it is still possible for some entrained particles, so called "fines", to exit the top of the disengagement zone entrained in the fluidising gas.

It is possible to tolerate some fines in the fluidising gas recycle line, although they can cause fouling in the line and components therein, such as heat exchangers and compressors. Alternatively, it is possible to provide a separation means, usually one or more cyclones, in the line exiting the top of the disengagement zone and which act to remove fines from the fluidising gas exiting the reactor. The removed fines can then be returned to the reactor, whilst the gas phase, essentially free of fines can be recycled as conventional in the art.

In general, the reduction in fluidising gas velocity in the disengagement zone compared to its velocity in the fluidisation zone is directly related to the relative cross-sectional areas. Thus, doubling the cross-sectional area halves the gas velocity. Thus, when designing and building reactors to date it has been normal simply to retain the relative cross-sectional dimensions of the disengagement zone compared to the fluidisation zone. A typical ratio has been in the range 2.5 to 2.9, preferably 2.6 to 2.8 (see, for example U.S. Pat. No. 4,588,790, U.S. Pat. No. 4,543,399). This is a relatively narrow range, but such a narrow range has been typical because it is desired to have a minimum ratio to ensure suitable velocity reduction, but increases over and above this minimum have been generally believed to provide little advantage for the increased cost. (The disengagement zone is supported at the top of the reactor. Larger, and hence heavier, disengagement zones require more material to construct and require more "support", so there is significant incentive to minimise the size.)

Despite the above, it has now surprisingly been found that when polymerisation processes are operating in reactors with relatively large cross-sectional area in the fluidisation zone, it is significantly advantageous to use a disengagement zone with a cross-sectional area which is itself relatively large compared to the cross-sectional area of the fluidisation zone.

Thus, in a first aspect, the present invention provides an apparatus for gas phase fluidised bed polymerisation of olefins, which apparatus comprises:

A) a first section which is an upright cylindrical section having a diameter, $D_1$, and cross-sectional area, $A_1$, and
B) a second section, provided vertically above the first section and centred about a common vertical axis to the upright cylindrical first section, the base of the second section having a cylindrical cross-section of diameter $D_1$ and being joined to the top of the first section, and the horizontal cross-sectional area of the second section above its base being greater than the cross-sectional area of the first section,
characterised in that:
  i) $D_1$ is greater than 4.5 metres, and
  ii) the second section has a maximum horizontal cross-sectional area, $A_2$, which is between 3.2 and 6 times the cross-sectional area, $A_1$, of the first section.

Further, in a second aspect, the present invention provides a process for polymerisation of olefins, which process comprises polymerising one or more olefins under fluidised bed reaction conditions in an apparatus which comprises:

A) a first section which is an upright cylindrical section having a diameter, $D_1$, and cross-sectional area, $A_1$, and
B) a second section, provided vertically above the first section and centred about a common vertical axis to the upright cylindrical first section, the base of the second section having a cylindrical cross-section of diameter $D_1$ and being joined to the top of the first section, and the horizontal cross-sectional area of the second section above its base being greater than the cross-sectional area of the first section,
and characterised in that:
  i) $D_1$ is greater than 4.5 metres, and
  ii) the second section has a maximum horizontal cross-sectional area, $A_2$, which is between 3.2 and 6 times the cross-sectional area, $A_1$, of the first section.

For avoidance of doubt, the horizontal cross-sectional area of the first section is $\pi(D_1/2)^2$.

As $D_1$ is at least 4.5 metres, the area, $A_1$, of the first section is at least 15.9 m$^2$, and $A_2$ must be at least 50.9 m$^2$.

Preferably $D_1$ is at least 5 metres, $A_1$ then being at least 19.6 m$^2$, and $A_2$ being at least 62.8 m$^2$.

There is no particular upper limit on $D_1$, but generally $D_1$ will be less than 10 metres, for example in the range 5 to 7 metres.

The second section has a horizontal cross-sectional area above its base being greater than the cross-sectional area of the first section and a maximum horizontal cross-sectional area, $A_2$, which is between 3.2 and 6 times the cross-sectional area, $A_1$, of the first section. Thus, the second section forms a section of expanded cross-sectional area compared to the first section.

Preferably, the second section has a maximum horizontal cross-sectional area, $A_2$, which is between 4 and 6 times the cross-sectional area, $A_1$, of the first section The second section preferably has a circular horizontal cross-section.

The second section is generally a disengagement section or zone as known in the art, but with increased relative cross-sectional area at its widest point.

In a first embodiment, the second section may be in the form of an inverted truncated cone, in which the horizontal cross-sectional area increases with height over the whole height of the second section, and in which case the maximum area is that at the top of said second section.

In a second embodiment, the second section may comprise a lower part which is in the form of an inverted truncated cone and an upper part, connected to the top of the lower part, which is an upright cylindrical part, said cylindrical part being centred about the common vertical axis to the cylindrical first section and having a horizontal cross-section of area which is between 3.2 and 6 times $A_1$. (In this second embodiment, the truncated cone part is usually of much lower height than the truncated cone of the first embodiment, and the change of cross-sectional area with height in the truncated cone part of this second embodiment is relatively rapid compared to the first embodiment.)

The overall height of the second section may be "conventional", by which is meant of a similar height to disengagement vessels with a lower maximum area relative to the first section, in which case the second section will widen at an angle closer to the horizontal compared to disengagement vessels with a lower maximum area relative to the first section. Alternatively, the height of the second section may also be increased compared to disengagement vessels with a lower maximum area relative to the first section, for example the angle of widening may be the same or approximately the same as used in disengagement vessels with a lower maximum area relative to the first section. In either case, to minimise entrainment, the height should be greater than the transport disengagement height (TDH) of the fluidised stream, as known in the art.

The first and second section may collectively be referred to as "reactor" or "fluidised bed reactor".

Other than the specified dimension of the present invention the reactor and process therein are as conventional in the art. Examples of fluidised bed reactors and their operation include EP 0 475 603, EP 1 240 217, EP 1 484 344 and EP 0 855 411.

In fluidised bed processes, the particles of polymer being formed are maintained in the fluidised state by virtue of a reaction gas mixture containing the monomers to be polymerised travelling in a rising stream. The polymer thus manufactured in powder form is generally drained from the reactor in order to keep the bed of fluidised polymer particles at a more or less constant volume. The process generally employs a fluidisation grid which distributes the reaction gas mixture through the bed of polymer particles and which acts as a support for the bed in the event of a cut in the flow of the rising gas. The reaction gas mixture leaving at the top of the fluidised-bed reactor is recycled to the base of the latter under the fluidisation grid by means of an external circulation conduit.

The polymerisation of the olefins is an exothermic reaction. The reaction mixture comprising the olefins to be polymerised is generally cooled by means of at least one heat exchanger arranged on the outside of the reactor before being recycled. One or more compounds may be injected into the reaction zone in liquid form. Vaporisation of the liquid in the reaction zone provides the effect of cooling directly in the reaction zone.

It will be apparent from the above that the apparatus will generally also comprise components typical of a fluidised bed reactor, including:

1) a top section, located above and joined to the top of the second section, which acts to close the top of the reactor, and is usually in the form of a dome, 2) one or more gas outlets located near, and preferably at, the top of the apparatus and through which the fluidising gas may exit the apparatus, 3) a fluidisation grid located at the base of the first section, which acts to support the bed in the absence of the fluidising gas, 4) a bottom section, located below and joined to the base of the first section, which acts to close the bottom of the reactor, and is usually in the form of an inverted dome, 5) one or more gas inlets, located in the bottom section, for providing fluidising gas below the fluidisation grid, 6) a recycle line linking the one or more gas outlets at the top of the apparatus with the one or more gas inlets located in the bottom section, and 7) one or more polymer withdrawal outlets located on the first section.

The apparatus will preferably also comprise one or more of the following, which are generally known in the art:

1) One or more components on the recycle line for treating the fluidising gas before recycle, such as compressors, heat exchangers, purge lines and/or reactant introduction lines, 2) One or more inlets for introducing components of the reaction, such as catalyst, reactants or inert liquids directly into the first section of the reactor, and 3) One or more cyclones provided on the recycle line near the one or more gas outlets for removal of entrained fines.

There has been a trend in recent years to try and design fluidised bed polymerisation reactors with increasing diameter in the first/fluidisation section, in particular to provide increased productivity from a single reactor.

It has now been found that at the relatively large reactor diameters concerned herein, which are defined as a diameter, $D_1$, in the first section (fluidisation zone) of more than 4.5 m, preferably more than 5 m, the higher overall gas throughput results in an increase in particle fines even if the size of the disengagement zone is increased in proportion to the fluidisation zone.

This has surprisingly been found to be the case even if the same linear gas velocity (fluidisation velocity, $V_f$) is used in the reactor.

In contrast, by use of the apparatus according to the present invention, a significantly reduced entrainment can be achieved, even compared to smaller diameter reactors operating under otherwise "equivalent" conditions (such as the same fluidisation velocity).

In one embodiment this advantage may be used to allow an increased fluidisation velocity to be used in the process according to the present invention whilst still retaining total entrainment at or below acceptable levels, and in particular, at or below the levels which may be obtained on smaller reactors.

Thus, whilst the fluidisation velocity in the process of the present invention generally may be within "typical" ranges used for smaller diameter reactors, such as in the range 0.1 to 1 m/s, in preferred embodiments of the present invention fluidisation velocities over 1 m/s, for example, between 1 and 1.5 m/s may be used.

Alternatively, or in addition, the reduced entrainment that can be achieved compared to smaller diameter reactors operating under otherwise equivalent conditions by use of the apparatus according to the present invention, allows increased flexibility to adjust other parameters to improve the overall productivity of the polymerisation process. Examples of suitable parameters include the overall reactor pressure and/or the amounts of normally liquid hydrocarbons added to the reaction zone, increases of which both aid heat removal from the reaction, which can result in increased space-time-yield. Increases in such parameters, whilst generally known to be beneficial, are often limited because they also increase the average density of the fluidising gas, which tends to increase entrainment.

In the process of the present invention adjustment of such parameters may still increase entrainment, but because the process of the present invention is starting from a lower level of entrainment than a smaller diameter reactor operating under otherwise "equivalent" conditions in the first place, it is possible to adjust these parameters more or with more flexibility than is possible for the smaller diameter reactor, whilst still retaining total entrainment at or below acceptable levels, and in particular, at or below the levels which may be obtained on smaller reactors.

For example, whilst the gas density in the process of the present invention generally may be within "typical" ranges used for smaller diameter reactors, such as in the range 20 to 30 $kg/m^3$, in preferred embodiments of the present invention gas densities over 30 $kg/m^3$ may be used, such as at least 31 $kg/m^3$ and/or up to 40 $kg/m^3$.

For avoidance of any doubt, by "normally liquid hydrocarbons" is meant hydrocarbons which are liquids at standard temperature and pressure. Such hydrocarbons are often referred to as inert condensing agents. Typical examples of such hydrocarbons are individual alkanes having 4 to 8 carbon atoms, or mixture of such alkanes.

Preferably, the process of the present invention is operated such that the entrainment out of the reactor, measured as the amount of particles exiting the reactor per unit time through an outlet pipe at the top of the reactor, is 1500 kg/h or less, preferably 1200 kg/h or less.

In a particular embodiment, the entrainment out of the reactor, measured as the amount of particles exiting the reactor per unit time through an outlet pipe at the top of the reactor, is 1500 kg/h or less, preferably 1200 kg/h or less, and the fluidisation velocity is greater than 0.81 m/s.

The product polymer removed from the reaction vessel is passed to a degassing vessel wherein it is contacted with a purge gas to remove unreacted monomers (principal olefin and comonomer(s)).

The degassing step or steps of the present invention may take place in any suitable degassing vessel or vessels. For example, the degassing vessel may consist of a "combined degasser" in which two of more degassing stages are present in a single degassing column. The contact of the purge gas and the polymer to be degassed usually takes place countercurrently, for example by passing purge gas to the base of a degassing vessel and polymer to be degassed to the top of said vessel so that they are contacted therein, and withdrawing the degassed polymer from the base and the purge gas from the top of the vessel.

The catalyst used in production of the polymer in step (a) may be any suitable catalyst. Examples of suitable catalysts that are known for polymerisation reactions include metallocene, Ziegler (or "Ziegler-Natta") and "Phillips" (or "chromium") catalysts, and mixtures thereof.

BRIEF DESCRIPTION OF THE FIGURE

The invention will now be illustrated by the following Examples and FIG. 1, where FIGURE represents in schematic form a fluidised bed reactor for the gas phase polymerisation of olefins.

With respect to FIG. 1, there is shown a fluidised bed reactor which comprises a first section (1) which is an upright cylindrical section having a diameter, $D_1$, and a second section (2) which is an inverted truncated cone provided vertically above the first section and centred about a common vertical axis to the upright cylindrical first section, the base of the second section having a cylindrical cross-section of diameter $D_1$ (corresponding to a horizontal cross-sectional area, $A_1$) and being joined to the top of the first section, and the cross-sectional area of the second section above its base increasing to a maximum diameter, $D_2$ (corresponding to the point of maximum horizontal cross-sectional area, $A_2$).

At the top of the second section is a dome (3).

Fluidising gas enters the first section through line (4) and a fluidisation grid (not shown) and exits the top of the reactor through an outlet pipe represented as line (5).

EXAMPLES

The following Examples represent modelling of entrainment of particles from a series of fluidised bed reactors. A typical commercial reactor of the type represented by FIG. 1 has been modelled. In the Comparative Examples and Examples 1 to 3 according to the invention, a fluidising gas was used having a density of 27 $kg/m^3$ at a constant fluidising velocity, $V_f$, of 0.75 m/s. Examples 4 and 5 are similar except that in Example 4 the fluidising velocity is increased, whilst in Example 5 the gas density is increased.

In all examples, the second section widens at a constant angle from where it joins the top of the cylindrical first section to the point of maximum diameter, $D_2$. Thus, the height above the top of the cylindrical first section of the widest part of the second section in each case is proportional to difference between maximum bulb diameter and cylinder diameter.

Comparative Examples

In Comparative Example A, the reactor has a diameter, $D_1$, of 4 m in the cylindrical first section, and a maximum diameter of the second section, $D_2$, of 6.6 m (ratio of $A_2/A_1=2.7$). Entrainment, measured as the amount of particles exiting the reactor per unit time through the outlet pipe at the top of the reactor, is found to be 1655 kg/h.

In Comparative Example B the reactor diameter is increased to 5.3 m. The second section is increased in size correspondingly to maintain the ratio $A_2/A_1=2.7$. Despite this and the fact that the same fluidisation velocity is used, carry-over increases to 2905 kg/h, an increase of 75%.

In Comparative Example C, the reactor diameter is again 5.3 m, but the maximum diameter of the second section, $D_2$, is increased to 9.2 m (ratio of $A_2/A_1=3$).

This results in entrainment of 2050 kg/h. Although this is a reduction in entrainment compared to Comparative Example B, it is still an increase of nearly 25% compared to Comparative Example A.

Examples According to the Invention

Examples 1 to 3

In Example 1, the reactor diameter is again 5.3 m, but the maximum diameter of the second section, $D_2$, is increased to 10.2 m (ratio of $A_2/A_1=3.7$). This results in entrainment of 1380 kg/h.

In Example 2, the reactor diameter is again 5.3 m, but the maximum diameter of the second section, $D_2$, is increased to 10.6 m (ratio of $A_2/A_1=4$). This results in entrainment of 1200 kg/h.

In Example 3, the reactor diameter is again 5.3 m, but the maximum diameter of the second section, $D_2$, is increased to 11.9 m (ratio of $A_2/A_1=5$). This results in entrainment of 690 kg/h.

The above Examples show that to reduce entrainment when larger diameter reactors are used compared to when smaller diameter reactors are used it is necessary to significantly increase the area, $A_2$, relative to the area of the reactor, $A_1$.

Examples 4 and 5

These Examples illustrate the possibility to use the present invention to optimise other process parameters in the gas phase polymerisation while keeping entrainment comparable to Comparative Example A.

In Example 4, the reactor diameter is 5.3 m, and the maximum diameter of the second section, $D_2$, is 10.6 m (ratio of $A_2/A_1=4$). This is the same reactor as used in Example 2. However, for this Example, the fluidising velocity, $V_f$, is increased from 0.75 m/s to 0.85 m/s (the gas density is maintained at 27 kg/m$^3$). Entrainment is 1600 kg/h, which whilst an increase compared to Example 2 is still comparable to (in fact slightly less than) that obtained from the smaller reactor of Comparative Example A. The increased fluidising velocity increases the heat removal capacity of the reactor, which allows an increase in the production rate to be achieved compared to Example 2, of the order of 10 to 15%.

In Example 5, the reactor diameter is 5.3 m, and the maximum diameter of the second section, $D_2$, is 10.6 m (ratio of $A_2/A_1=4$). This is the same reactor as used in Example 2 and Example 4 again. In this case the gas density is increased from 27 kg/m$^3$ to 40 kg/m$^3$ (whilst the fluidising velocity, $V_f$, is maintained at 0.75 m/s). Entrainment is again 1600 kg/h. The increased gas density again allows an increase in the heat removal capacity of the reactor, which allows an increase in the production rate to be achieved, of the order of 10 to 15%.

Examples 4 and 5 show that it is possible to optimise the process parameters to increase the production rate in the present invention whilst still obtaining entrainment equivalent to that obtained in a smaller reactor. The present invention thus provides an increased flexibility for the person skilled in the art to optimise the polymerisation process. For example, the person skilled in the art may decide to operate with an increased fluidisation velocity or an increased gas density as shown in Examples 4 and 5, or use a combination of both increased fluidisation velocity or an increased gas density, or may also or instead optimise other process parameters to increase production rate. Alternatively, the person skilled in the art may decide to operate with lower levels of entrainment, for example at the levels shown in Example 2, at lower levels than this, or at levels between this and those of Examples 4 and 5, such as at 1500 kg/h or less.

The invention claimed is:

1. An apparatus for gas phase fluidized bed polymerization of olefins, which apparatus comprises:
    A) a first section which is an upright cylindrical section having a diameter, $D_1$, and cross-sectional area, $A_1$, and
    B) a second section, provided vertically above the first section and centred about a common vertical axis to the upright cylindrical first section, the base of the second section having a cylindrical cross-section of diameter $D_1$ and being joined to the top of the first section, and the horizontal cross-sectional area of the second section above its base being greater than the cross-sectional area of the first section, characterized in that:
    i) $D_1$ is greater than 4.5 meters, and
    ii) the second section has a maximum horizontal cross-sectional area, $A_2$, which is between 3.2 and 6 times the cross-sectional area, $A_1$, of the first section.

2. An apparatus according to claim 1 wherein the second section is in the form of an inverted truncated cone in which the horizontal cross-section area increases with height over the whole height of the section.

3. An apparatus according to claim 1 wherein the second section comprises a lower part which is in the form of an inverted truncated cone, on top of which is provided a further cylinder, said further cylinder having a horizontal cross-section of area which is between 3.2 and 6 times $A_1$.

4. An apparatus according to claim 1 wherein $D_1$ is at least 5 meters.

5. An apparatus according to claim 1 wherein the second section has a maximum horizontal cross-sectional area, $A_2$, which is between 4 and 6 times the cross-sectional area, $A_1$, of the first section.

6. A process for polymerization of olefins, which process comprises polymerizing one or more olefins under fluidized bed reaction conditions in an apparatus according to claim 1.

7. A process according to claim 6 wherein the fluidization velocity is at least 0.81 cm/s.

8. A process according to claim 6 wherein the gas density of the fluidizing gas is at least 30 kg/m$^3$.

9. A process according to claim 6 wherein the entrainment out of the reactor, measured as the amount of particles exiting the reactor per unit time through an outlet pipe at the top of the reactor, is 1500 kg/h or less.

10. A process according to claim 6 wherein the gas density of the fluidizing gas is at least 31 kg/m$^3$.

* * * * *